Patented Aug. 24, 1943

2,327,535

UNITED STATES PATENT OFFICE 2,327,535

LUBRICATING COMPOSITION

Eugene Lieber, Staten Island, N. Y., and Harry T. Rice, Roselle, N. J., assignors to Standard Oil Development Company, a corporation of Delaware No Drawing. Application December 27, 1940, Serial No. 371,997

7 Claims. (Cl. 252—59)

This invention relates to wax lubricating oils containing as a wax modifying agent produced by subjecting low boiling halogenated aliphatic hydrocarbons to chemical condensation.

This condensation is preferably carried out in the presence of a catalyst or condensing agent as will be more fully discussed later.

The halogenated aliphatic hydrocarbons to be used should contain less than 7 carbon atoms and may be mono- or poly-substituted hydrocarbons or mixtures of compounds, some of which contain only one halogen atom and some of which contain two or more halogen atoms. It is preferred to use compounds having from three to six carbon atoms, and from both a technical and commercial point of view it is still further preferred to use compounds having 5 carbon atoms; because it is possible to obtain commercially at relatively low cost and in fairly high degree of purity a product called "mixed amyl chlorides," which consists essentially of isomers having the general formula $C_5H_{11}Cl$, and also a product referred to commercially as mixed dichlor pentanes, having the general formula $C_5H_{10}Cl_2$, about 40% by weight of which consists of true amylene dichlorides $CH_3CHCl_2$, and about 60% of which represents other dichlor derivatives of normal and iso-pentanes. This dichlor product has a boiling point of about 95% between 130° and 200° C., thus indicating that it is substantially free of monochlor pentanes. The invention has been found to work very satisfactorily when using either all monochlor pentanes or all dichlor pentanes or various mixtures of these two products, especially when the latter are reacted in certain preferred proportions.

Although the mono- and di-halogenated compounds are preferred, it is possible to use still higher halogenated aliphatic hydrocarbons, e. g., those containing 3 or even more chlorine atoms for example, as in trichlor pentane, tetrachlor hexane, etc. Also if desired, the mono-, di-, or other poly-halogenated derivatives of other paraffin hydrocarbons having less than 7 carbon atoms may be used, such as the derivatives of butane and propane, and in certain circumstances even the derivatives of ethane and methane, although these do not give very good yields of high molecular weight products having pour-depressing properties.

To effect the condensation, it is preferred to use anhydrous aluminum chloride, as catalyst, although other Friedel-Crafts catalysts can be used, such as, boron fluoride, zinc chloride, ferric chloride, titanium tetrachloride, boron trichloride and in some cases even anhydrous hydrogen fluoride. Although such Friedel-Crafts catalysts are preferred, it is also possible to use other condensing agents, such as activated clay, silica gels, finely divided metals, such as aluminum, zinc, etc.

The proportions to be used in carrying out the reactions should usually be about .05 to .50 mol of Friedel-Crafts catalyst to 1 mol of halogenated hydrocarbons, or preferably 10 to 40 parts by weight of aluminum chloride per 100 parts by weight of mono- or dichlor pentane. If mixed mono- and poly-halogenated hydrocarbons are used, it is preferred that the mixture should contain at least 30% of the di- or higher poly-halogenated aliphatic hydrocarbons.

In carrying out the invention, the reaction temperature should be maintained between the approximate limits of room temperature and about 400° F. Superatmospheric pressure (e. g. 1, 5, 10 or 20 atmospheres or higher) may be used, especially in the case of reactants having a low number of carbon atoms. It is preferred to add the Friedel-Crafts catalyst or other condensing agent to the reactants gradually at room temperature and then to heat the reaction mass to the desired maximum temperature and maintain it there for the desired length of time, which should generally be between the approximate limits of ½ hour and about 20 hours, preferably 1 to 5 hours. The temperature and time should be adjusted to obtain the desired combination of high yield and pour depressor potency. After the reaction has been completed, which may in many cases be judged by the approximate cessation of the evolution of hydrogen chloride, the reaction mixture is cooled and diluted with an inert diluent, such as a refined kerosene and neutralized by any of the known methods, such as by adding water or aqueous caustic soda or a mixture of water and alcohol, etc. The kerosene extract is allowed to settle and the catalyst sludge layer is drawn off. The kerosene extract is now filtered if any insoluble products are present and then this extract is distilled to remove the solvent and low boiling products, this distillation being preferably carried out under vacuum or with fire and steam, in the latter case carrying out the distillation up to about 600° F. In case the catalyst used is one of a different type than the Friedel-Crafts catalyst, it is separated from the reaction products by any suitable known method, e. g. filtering, etc., and the condensation product is distilled, preferably after dilution with a refined kerosene or other suitable solvent, to obtain a high molecular weight distillation residue.

The condensation product of this invention is soluble in mineral oils and is substantially non-volatile at temperatures below about 600° F., having a fairly high molecular weight. Its physical appearance and texture generally range from a green, viscous oil to a black resin. Although the chemical structure of these products has not been determined with certainty, it is believed that they are essentially linear type aliphatic hydrocarbons of a highly irregular branched nature.

The product of this invention has the property of modifying the crystal structure of waxes such as paraffin wax present when added to compositions containing the same. For instance, when about .05–10.0%, preferably .2–5.0%, of this wax modifier is added to a waxy lubricating oil such as a Pennsylvania type lubricating oil having a relatively high pour point, the resultant blend will have a substantially lower pour point; in other words, this wax modifier is an effective pour depressor for waxy oils. A small amount of this wax modifier is also useful as a dewaxing aid for removing wax from mineral lubricating oils of undesirably high wax content. In similarly small amounts, this wax modifier may also be incorporated into paraffin wax or compositions containing the same to be used for various purposes such as for coating or impregnating paper, etc., or for making various molded products.

For the sake of illustration, but without limiting the invention to the particular materials used a series of tests was made in which the reactant used was either a mixed amyl chloride of commerce, or a mixed dichlor pentane commercial product, or a mixture of these mono- and dichlor products. The procedure used was the preferred process described above, the heating being carried out by refluxing the reaction mixture unless the temperature is otherwise specified. The quantity of reactant and aluminum chloride catalyst used, the temperature and time of reaction, the yield and pour-depressing potency of the product are given in the following table. The pour-depressing potency is shown as the A. S. T. M. pour point of a blend containing 1% or 2% (as shown) of the condensation product in a waxy (paraffinic) lubricating oil base stock having a pour point of +30° F. The product was a green, viscous oil in all tests except No. 6 where the product was a black, brittle resin, test No. 7 where it was a green resin, and test No. 8 where the product was a brown resin.

It is noted from the above table that the products of this invention are potent pour depressors, since an addition of 2% thereof to a waxy lubricating oil base stock having a pour point of +30° F., reduced the pour point to from −5° F. to even below −30° F. This is a very surprising result because those familiar with the art of preparing pour depressors have usually heretofore considered that it was necessary always to use at least one reactant containing relatively long aliphatic hydrocarbon chains, as that in the Davis patent which discloses the condensation of chlorinated paraffin wax with naphthalene, to make a pour depressor. Numerous other patents and literature references teach that long aliphatic chains are essential for the preparation of pour depressors, and hence the discovery disclosed herein of making potent pour depressors from mono- and poly-halogenated aliphatic hydrocarbons having less than 7 carbon atoms is not only new but very unexpected.

It is not intended that this invention be limited to any of the specific examples which were given merely for the sake of illustration nor to any theory as to the mechanism of the operation of the invention, but only by the appended claims in which it is intended to claim all novelty inherent in the invention as broadly as the prior art permits.

We claim:

1. A lubricating oil composition comprising a major proportion of a waxy hydrocarbon oil and a small amount of an auto-condensation product of a chlorine-containing paraffinic hydrocarbon substance having less than 7 carbon atoms and containing 1 to 2 chlorine atoms, said auto-condensation product being substantially non-volatile at temperatures below about 600° F.

2. A lubricating oil composition comprising a major proportion of a waxy lubricating oil having dissolved therein a small amount of a pour depressor consisting essentially of an auto-condensation product of a chlorine-containing paraffinic hydrocarbon substance having 3 to 6 carbon atoms and containing 1 to 2 chlorine atoms.

3. A lubricating oil composition comprising a major proportion of a waxy lubricating oil and dissolved therein a pour-depressing amount of a Friedel-Crafts auto-condensation product of a chloro pentane.

Table

| Test No. | Mixed $C_5H_{11}Cl$ (g.) | Mixed $C_5H_{10}Cl_2$ (g.) | $AlCl_3$ (g.) | Temp., °F. | Time, hrs. | Product Yield (g.) | °F. pour point of blends[1] per cent addition 1 | °F. pour point of blends[1] per cent addition 2 | |
|---|---|---|---|---|---|---|---|---|---|
| 1 | 300 | | 30 | Reflux | 4 | 54 | | −20 | Dark green visc. oil. |
| 2 | 300 | | 60 | do | ¾ | 35 | | −20 | Do. |
| 3 | 300 | | 90 | do | 4 | 47 | | −15 | Do. |
| 4 | 300 | | 120 | do | 1½ | 63 | | −15 | Do. |
| 5 | 300 | | 150 | 220 | 3 | 71 | | −5 | Do. |
| 6 | | 300 | 30 | Reflux | 1 | 29 | −15 | −30 | Black brittle resin. |
| 7 | | 300 | 90 | Room | 22 | 35 | | −15 | Green resin. |
| 8 | | 300 | 120 | 150 | 4 | 64 | | −5 | Brown resin. |
| 9 | 150 | 150 | 30 | 150 | 4 | 63 | −15 | −25 | Green visc. oil. |
| 10 | 150 | 150 | 90 | Reflux | 4 | 73 | | −20 | Do. |
| 11 | 150 | 150 | 120 | do | 4 | 61 | | −20 | Do. |
| 12 | 150 | 150 | 150 | do | 4 | 77 | | −10 | Do. |
| 13 | 250 | 50 | 90 | do | 4 | 51 | | −10 | Do. |
| 14 | 200 | 100 | 90 | do | 4 | 59 | | −20 | Do. |
| 15 | 150 | 150 | 90 | do | 4 | 73 | | −20 | Do. |
| 16 | 100 | 200 | 90 | do | 4 | 58 | | −10 | Do. |
| 17 | 50 | 250 | 90 | do | 4 | 52 | | −15 | Do. |

[1] In oil base stock having pour point of 30° F.

4. A lubricating oil composition comprising a major proportion of a waxy mineral lubricating oil and dissolved therein a pour-depressing amount of a high molecular weight auto-condensation product of amyl chloride.

5. A lubricating oil composition comprising a major proportion of a waxy mineral lubricating oil and dissolved therein a pour-depressing amount of a high molecular weight auto-condensation product of a chloro pentane substance containing at least a substantial proportion of dichlor pentane.

6. A lubricating oil composition comprising a major proportion of a waxy hydrocarbon oil and a small amount of an auto-condensation product of a halogenated aliphatic hydrocarbon having less than 7 carbon atoms.

7. A lubricating oil composition comprising a major proportion of a waxy mineral lubricating oil and a pour depressing amount of a high molecular weight auto-condensation product obtained by subjecting chloro pentane containing 1 to 2 chlorine atoms to auto-condensation using about 10 to 40 parts by weight of aluminum chloride as catalyst per 100 parts by weight of chloro pentane, hydrolyzing and removing the catalyst from the reaction products, diluting the condensation product with a volatile inert hydrocarbon diluent and distilling the resulting solution with fire and steam to about 600° F.

EUGENE LIEBER.
HARRY T. RICE.